(12) United States Patent
Guo

(10) Patent No.: US 10,578,742 B2
(45) Date of Patent: Mar. 3, 2020

(54) LIDAR-BASED MAPPING METHOD, DEVICE AND SYSTEM

(71) Applicant: Beijing Green Valley Technology Co., Ltd., Beijing (CN)

(72) Inventor: Yanming Guo, Beijing (CN)

(73) Assignee: Beijing Green Valley Technology Co., Ltd., Beijing (CN)

(*) Notice: Subject to any disclaimer, the term of this patent is extended or adjusted under 35 U.S.C. 154(b) by 60 days.

(21) Appl. No.: 15/895,943

(22) Filed: Feb. 13, 2018

(65) Prior Publication Data

US 2018/0341022 A1 Nov. 29, 2018

(30) Foreign Application Priority Data

May 24, 2017 (CN) .......................... 2017 1 0378189

(51) Int. Cl.
| | | |
|---|---|---|
| *G06K 9/00* | (2006.01) | |
| *G01S 17/89* | (2020.01) | |
| *G06F 17/11* | (2006.01) | |
| *G06K 9/62* | (2006.01) | |
| *G06F 17/16* | (2006.01) | |
| *G06F 16/29* | (2019.01) | |

(52) U.S. Cl.
CPC .............. *G01S 17/89* (2013.01); *G06F 16/29* (2019.01); *G06F 17/11* (2013.01); *G06F 17/16* (2013.01); *G06K 9/6217* (2013.01)

(58) Field of Classification Search
CPC ................................ G06F 17/11; G01S 7/4808
See application file for complete search history.

(56) References Cited

U.S. PATENT DOCUMENTS

| | | | |
|---|---|---|---|
| 9,870,624 B1* | 1/2018 | Narang ................... | G06T 7/521 |
| 2015/0268058 A1* | 9/2015 | Samarasekera .... | G06K 9/00637 |
| | | | 701/409 |
| 2018/0025235 A1* | 1/2018 | Fridman .......... | G08G 1/096725 |
| | | | 382/103 |
| 2018/0286072 A1* | 10/2018 | Tsai ........................ | G06T 7/579 |
| 2018/0336724 A1* | 11/2018 | Spring .................... | G06T 19/00 |

* cited by examiner

*Primary Examiner* — Oneal R Mistry
(74) *Attorney, Agent, or Firm* — Sandberg Phoenix & von Gontard, P.C.

(57) ABSTRACT

A LIDAR-based mapping method, device and system are provided. The method includes: acquiring two initial data frames corresponding to adjacent scanning periods respectively; extracting point, line and surface features from the two initial data frames respectively according to a first preset algorithm, calculating, based on the features extracted from the two initial data frames, a first transformation matrix according to a second preset algorithm and performing registration between the two initial data frames; extracting point, line and surface features from the two intermediate data frames respectively according to the first preset algorithm and performing a second registration; and transforming a local coordinate data frame in a local coordinate system obtained via the second registration as a frame in a global coordinate system and updating the map.

14 Claims, 6 Drawing Sheets

LIDAR-BASED MAPPING METHOD, DEVICE AND SYSTEM

CROSS-REFERENCES TO RELATED APPLICATIONS

This application claims priority to Chinese patent application No. 201710378189.1, filed on May 24, 2017. The entire contents of the above application are hereby incorporated by reference.

TECHNICAL FIELD

Embodiments of the present disclosure relate to the field of data processing and, in particular, to a LIDAR-based mapping method, device and system.

BACKGROUND

At present, mobile mapping systems have shown broad prospects for application in various fields such as forest resource investigation, traffic facility monitoring and tunnel survey. Integrated navigation of Global Positioning System (GPS) and Inertial Measurement Unit (IMU, also known as inertial navigation system) is almost a standard configuration for mainstream mobile mapping systems. However, such systems fail to work effectively in the case of GPS signal failures.

Simultaneous Localization and Mapping (SLAM) technology can overcome the above shortcomings and reduce total costs of a three-dimensional mapping system. The application of the SLAM technology to mobile survey has become an international research hotspot. It is widely required in modern three-dimensional surveying and mapping, unmanned driving and intelligent robots. There are mainly three popular mobile survey schemes currently: laser-based SLAM, binocular-vision-based SLAM and depth-camera-based SLAM, among which laser-based SLAM is relatively stable and reliable.

However, in the related art, when the SLAM technology is applied to a LIDAR-based mobile mapping system, the accuracy of the outputted map needs to be improved.

SUMMARY

Embodiments of the present disclosure aim to provide a LIDAR-based mapping method, device and system to improve the low accuracy of a map outputted by a LIDAR- and SLAM-based mobile mapping system.

According to a first aspect, embodiments of the present disclosure provide a LIDAR-based mapping method, including:

acquiring a first initial data frame and a second initial data frame corresponding to adjacent scanning periods respectively, where the first initial data frame and the second initial data frame contain point cloud data scanned by a LIDAR and navigation data collected by an Inertial Measurement Unit (IMU), a scanning period corresponding to the first initial data frame precedes a scanning period corresponding to the second initial data frame and a serial number of the first initial data frame is greater than 1;

extracting point, line and surface features from the first initial data frame and the second initial data frame respectively according to a first preset algorithm, calculating, based on the features extracted from the first initial data frame and the second initial data frame, a first transformation matrix according to a second preset algorithm and obtaining a second intermediate data frame by multiplying the second initial data frame by the first transformation matrix;

extracting point, line and surface features from a first intermediate data frame corresponding to the first initial data frame and the second intermediate data frame respectively according to the first preset algorithm, calculating, based on the features extracted from the first intermediate data frame and the intermediate data frame, a second transformation matrix according to the second preset algorithm and obtaining a second local coordinate data frame by multiplying the second intermediate data frame by the second transformation matrix; and transforming the second local coordinate data frame in a local coordinate system as a frame in a global coordinate system and updating a map.

According to a second aspect, embodiments of the present disclosure provide a LIDAR-based mapping device, including:

an initial data frame acquiring module configured to obtain a first initial data frame and a second initial data frame corresponding to adjacent scanning periods respectively, where the first initial data frame and the second initial data frame contain point cloud data scanned by a LIDAR and navigation data collected by an IMU, a scanning period corresponding to the first initial data frame precedes a scanning period corresponding to the second initial data frame and a serial number of the first initial data frame is greater than 1;

an intermediate data frame calculating module configured to extract point, line and surface features from the first initial data frame and the second initial data frame respectively according to a first preset algorithm; calculate, based on the features extracted from the first initial data frame and the second initial data frame, a first transformation matrix according to a second preset algorithm and obtain a second intermediate data frame by multiplying the second initial data frame by the first transformation matrix;

a local coordinate data frame calculating module configured to extract point, line and surface features from a first intermediate data frame corresponding to the first initial data frame and the second intermediate data frame respectively according to the first preset algorithm; calculate, based on the features extracted from the first intermediate data frame and the second intermediate data frame, a second transformation matrix according to the second preset algorithm and obtain a second local coordinate data frame by multiplying the second intermediate data frame by the second transformation matrix; and a map updating module configured to transform the second local coordinate data frame in a local coordinate system as a frame in a global coordinate system and update a map.

According to a third aspect, embodiments of the present disclosure provide a LIDAR scanning system, including a LIDAR scanner, an IMU, a processor, a memory and a computer program stored in the memory and operable by the processor, where the computer program, when being executed by the processor, is configured to perform the following steps:

acquiring a first initial data frame and a second initial data frame corresponding to adjacent scanning periods respectively, where the first initial data frame and the second initial data frame contain point cloud data scanned by a LIDAR and navigation data collected by an Inertial Measurement Unit (IMU), a scanning period corresponding to the first initial data frame precedes a scanning period corresponding to the second initial data frame and a serial number of the first initial data frame is greater than 1;

extracting point, line and surface features from the first initial data frame and the second initial data frame respectively according to a first preset algorithm, calculating, based on the features extracted from the first initial data frame and the second initial data frame, a first transformation matrix according to a second preset algorithm and obtaining a second intermediate data frame by multiplying the second initial data frame by the first transformation matrix;

extracting point, line and surface features from a first intermediate data frame corresponding to the first initial data frame and the second intermediate data frame respectively according to the first preset algorithm, calculating, based on the features extracted from the first intermediate data frame and the second intermediate data frame, a second transformation matrix according to the second preset algorithm and obtaining a second local coordinate data frame by multiplying the second intermediate data frame by the second transformation matrix; and transforming the second local coordinate data frame in a local coordinate system as a frame in a global coordinate system and updating a map.

The LIDAR-based mapping method provided by embodiments of the present disclosure acquires initial data frames containing point cloud data scanned by a LIDAR and navigation data collected by an IMU, extracts point, line and surface features from the data frames according to a preset algorithm and registers the data frames based on the extracted features. The method improves the registration accuracy and accuracy. Then the method transforms a local coordinate system into a global coordinate system and updates the map. The map obtained in such a way has a high accuracy and accuracy. Moreover, GPS is not needed during the mapping process, so the method is applicable to multiple indoor and outdoor application scenarios and, in particular, to a mobile LIDAR scanning system. The hardware composition of the scanning system can be streamlined, thereby saving system space usage and manufacture costs. Furthermore, setting up a scanner on a station and manual stitching are needed in conventional methods while embodiments of the present disclosure can achieve automatic stitching.

DETAILED DESCRIPTION

The present disclosure is described more fully below through specific embodiments in connection with the accompanying drawings. It is to be understood that the specific embodiments set forth below are intended to explain and not to limit the present disclosure. It is to be noted that for ease of description, only a part related to the present disclosure rather than the whole structure is illustrated in the appended drawings.

Before exemplary embodiments are discussed in more detail, it is to be noted that some of the exemplary embodiments are described as processes or methods depicted in flowcharts. Although the steps are described as sequentially processed in the flowcharts, many of the steps may be implemented concurrently, coincidently or simultaneously. Moreover, the sequence of the steps may be rearranged. The process may be terminated when the operations thereof are completed, but may further have additional steps not included in the appended drawings. The process may correspond to a method, a function, a procedure, a subroutine, a subprogram and the like.

Embodiment I

Figure 1:
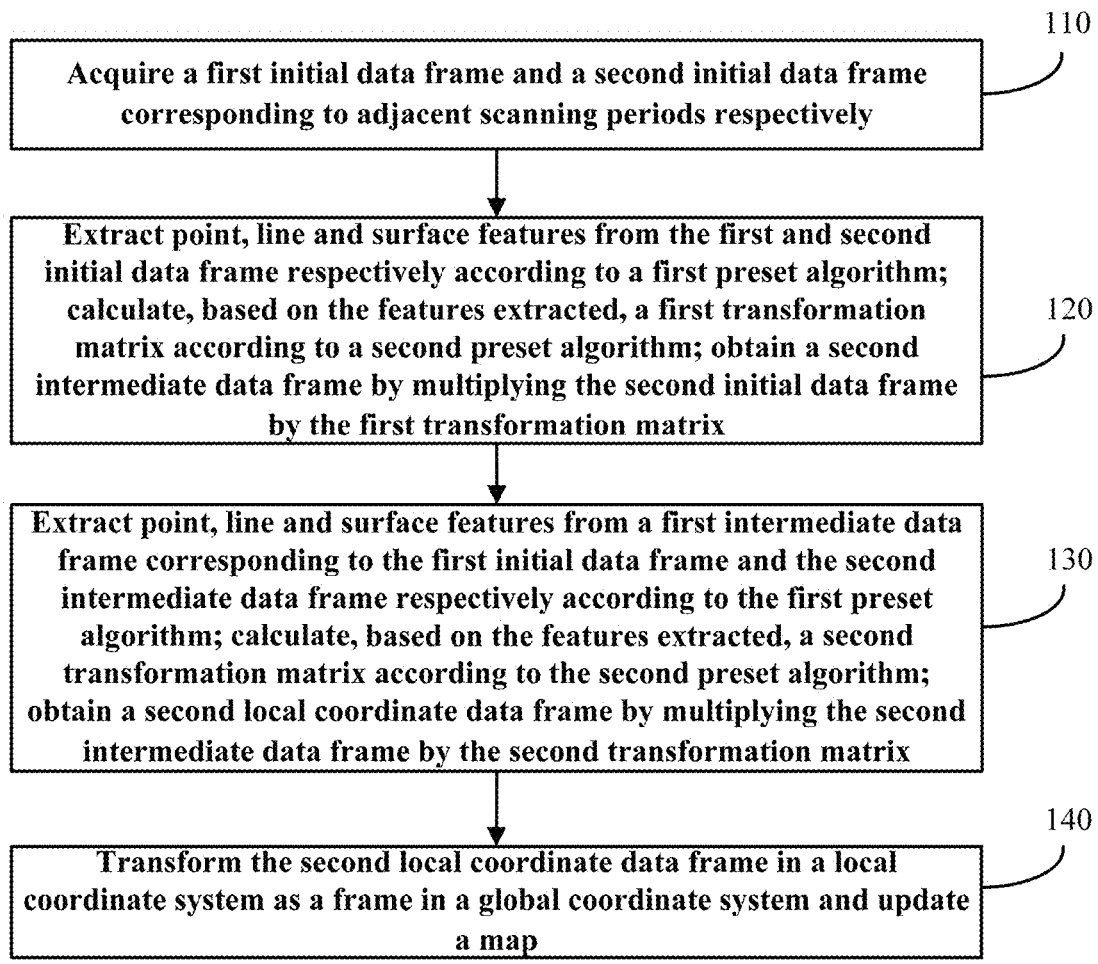
FIG. 1 is a flowchart illustrating a LIDAR-based mapping method according to embodiment I of the present disclosure.

FIG. 1 is a flowchart illustrating a LIDAR-based mapping method according to embodiment I of the present disclosure. The method may be performed by a LIDAR-based mapping device. The device may be implemented by software and/or hardware, and is typically integrated into a LIDAR scanning system. As illustrated in FIG. 1, the method includes steps 110, 120, 130 and 140.

In step 110, a first initial data frame and a second initial data frame corresponding to adjacent scanning periods are acquired respectively.

The initial data frames contain point cloud data scanned by a LIDAR and navigation data collected by an IMU. The scanning period corresponding to the first initial data frame precedes the scanning period corresponding to the second initial data frame, and the serial number of the first initial data frame is greater than 1.

Exemplarily, the LIDAR-based mapping device may be integrated into a storage control system of the LIDAR scanning system. The storage control system may be implemented by a personal computer (PC) or another type of terminal having storage and computing capabilities. In the case of a PC, the PC may be connected to a LIDAR scanner via a LIDAR scanner interface to acquire data from the LIDAR scanner. The LIDAR scanner interface may be implemented by a network port. The PC may further be connected to an IMU via an IMU interface to acquire navigation data from the IMU. The IMU interface may be implemented by a serial port. The PC may acquire data of the LIDAR scanner (referred to as LIDAR data) via the network port by means of starting a thread. Specifically, the LIDAR data may be transmitted in the form of data package to the PC. Initial data in the data package may include ranging information and angle information. Each time the LIDAR data package is received, the received data package may be transformed via a thread to data in the form of point cloud (referred to as point cloud data) containing X, Y, Z and time information. The PC may collect IMU data from the serial port by means of starting a thread. The IMU data may include time information, gyro data and accelerometer data. The PC may control the LIDAR scanner and the IMU to collect data at a preset frequency. A time for one collection may be referred to as a scanning period. Point cloud data and navigation data within the same scanning period form an initial data frame corresponding to the scanning period.

Preferably, in the present embodiment, data scanned at 360° may be considered as available data. The related art typically scans on a station while automatic scanning is adopted in the present embodiment. Data availability may be determined via angle information recorded in data acquired by the LIDAR scanner, and available data is used as the initial data frame.

It is to be noted that when the method of the present embodiment is executed for the first time, part of the map data already exists. That is, if the initial data frames are sorted in the order of the scanning period, the serial number of the first initial data frame is greater than 1 and the serial number of the second initial data frame is greater than 2. The first initial data frame and the second initial data frame corresponding to adjacent scanning periods are initial data frames with successive serial numbers.

In step 120, point, line and surface features are extracted from the first initial data frame and the second initial data frame respectively according to a first preset algorithm, a first transformation matrix is calculated based on the extracted features according to a second preset algorithm and a second intermediate data frame is acquired by multiplying the second initial data frame by the first transformation matrix.

In general, in an SLAM-based image data registration process, it is common to select salient feature regions and perform registration based on the salient feature regions. Salient feature regions are generally easily recognizable entities (also referred to as road signs). Usually high requirements are imposed on these entities and this registration method has a low registration accuracy, accuracy and efficiency. In the present embodiment, point, line and surface features are extracted from initial data frames and the transformation matrix is calculated based on these features to achieve registration between data frames, thereby improving the registration accuracy, accuracy and efficiency.

Preferably, point, line and surface features are extracted from the first initial data frame according to the first preset algorithm as follows:

extracting point, line and surface features from the first initial data frame according to the following formula:

$$f = \frac{1}{|p| \cdot \|X_i\|} \| \sum_{j \in p, j \neq i} \|(X_i - X_j)\| $$

where the first initial data frame is $P_k$, a point feature of $P_k$ is $F_{k1}$, a line feature of $P_k$ is $F_{k2}$, a surface feature of $P_k$ is $F_{k3}$, "i" is a point in $P_k$, $X_i$ is a coordinate of point "i", "p" is a set of neighborhood points of point "i", "j" is a point in "p", $X_j$ is a coordinate of point "j" and "f" is an eigenvalue; and thresholds $M_1$, $M_2$, $M_3$ and $M_4$ are pregiven, "f" is $F_{k1}$ when it is less than $M_1$; "f" is $F_1$ when it is greater than $M_2$ and less than $M_3$; and "f" is $F_{k3}$ when it is greater than $M_4$.

Preferably, $M_1=0.1$, $M_2=0.4$, $M_3=0.6$ and $M_4=0.8$.

Similarly, point, line and surface features can be extracted from the second initial data frame according to the above formula.

Optionally, the first transformation matrix based is calculated as follows based on the extracted features according to the second preset algorithm: solving, based on the extracted features, rotation and translation parameters between the first initial data frame and the second initial data frame via a least square method, thereby obtaining the first transformation matrix.

Specifically, the rotation and translation parameters may be solved according to the following formulas:

$$Y = RX + T$$

$$R = \begin{bmatrix} \cos\varphi & -\sin\varphi & 0 \\ \sin\varphi & \cos\varphi & 0 \\ 0 & 0 & 1 \end{bmatrix} \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\phi & -\sin\phi \\ 0 & \sin\phi & \cos\phi \end{bmatrix}$$

$$T = \begin{bmatrix} \Delta X \\ \Delta Y \\ \Delta Z \end{bmatrix}$$

In the formulas, Y denotes the features extracted from the second initial data frame, X denotes the features extracted from the first initial data frame, the three angles ($\varphi$, $\theta$, $\phi$) denote the rotation parameters, the three increments ($\Delta X$, $\Delta Y$, $\Delta Z$) denote the translation parameters, and the first transformation matrix is obtained from R and T.

In step 130, point, line and surface features are extracted from the first intermediate data frame corresponding to the first initial data frame and the second intermediate data frame respectively according to the first preset algorithm, a second transformation matrix is calculated based on the extracted features according to the second preset algorithm and a second local coordinate data frame is obtained by multiplying the second intermediate data frame by the second transformation matrix.

For the specific method for extracting point, line and surface features and the specific method for calculating the second transformation matrix, see related description regarding step 120. These methods will not be described herein.

In the present embodiment, the second intermediate data frame obtained after one registration and the first intermediate data frame corresponding to the first initial data frame are reregistered, thereby improving the registration accuracy.

In step 140, the second local coordinate data frame in a local coordinate system is transformed into a frame in a global coordinate system, and a map is updated.

Exemplarily, the data frame obtained through registration in step 130 is a data frame in the local coordinate system, and needs to be further transformed into a data frame in the global coordinate system and be integrated and stitched with the current map to update the map. Transformation modes between the local coordinate system and the global coordinate system are not limited in the present embodiment. For example, the transformation may be achieved by a rotation and transformation matrix.

It is to be understood that the present embodiment provides a flow for processing two adjacent initial data frames in a scanning and mapping process. However, the scanning and mapping process involves stitching of multiple initial data frames and updating of a map. Those skilled in the art can obtain, according to the present embodiment, a flow for processing all initial data frames in the entire scanning and mapping process to complete mapping of the entire map. This flow will not be described herein.

In the LIDAR-based mapping method provided by embodiment I of the present disclosure, obtaining initial data frames containing point cloud data scanned by the LIDAR and navigation data collected by the IMU; extracting point, line and surface features from the data frames according to a preset algorithm, and registering the data frames based on the extracted features. The method improves the registration accuracy and accuracy. Then the method transforms the local coordinate system into the global coordinate system and updates the map. The map obtained in such a way has a high accuracy and accuracy. Moreover, GPS is not needed during the mapping process, so the method is applicable to multiple indoor and outdoor application scenarios and, in particular, to a mobile LIDAR scanning system. The hardware composition of the scanning system can be streamlined, thereby saving system space usage and manufacture costs. Furthermore, setting up a scanner on a station and manual stitching are needed in conventional methods while the present embodiment can achieve automatic stitching.

Embodiment II

Figure 2:
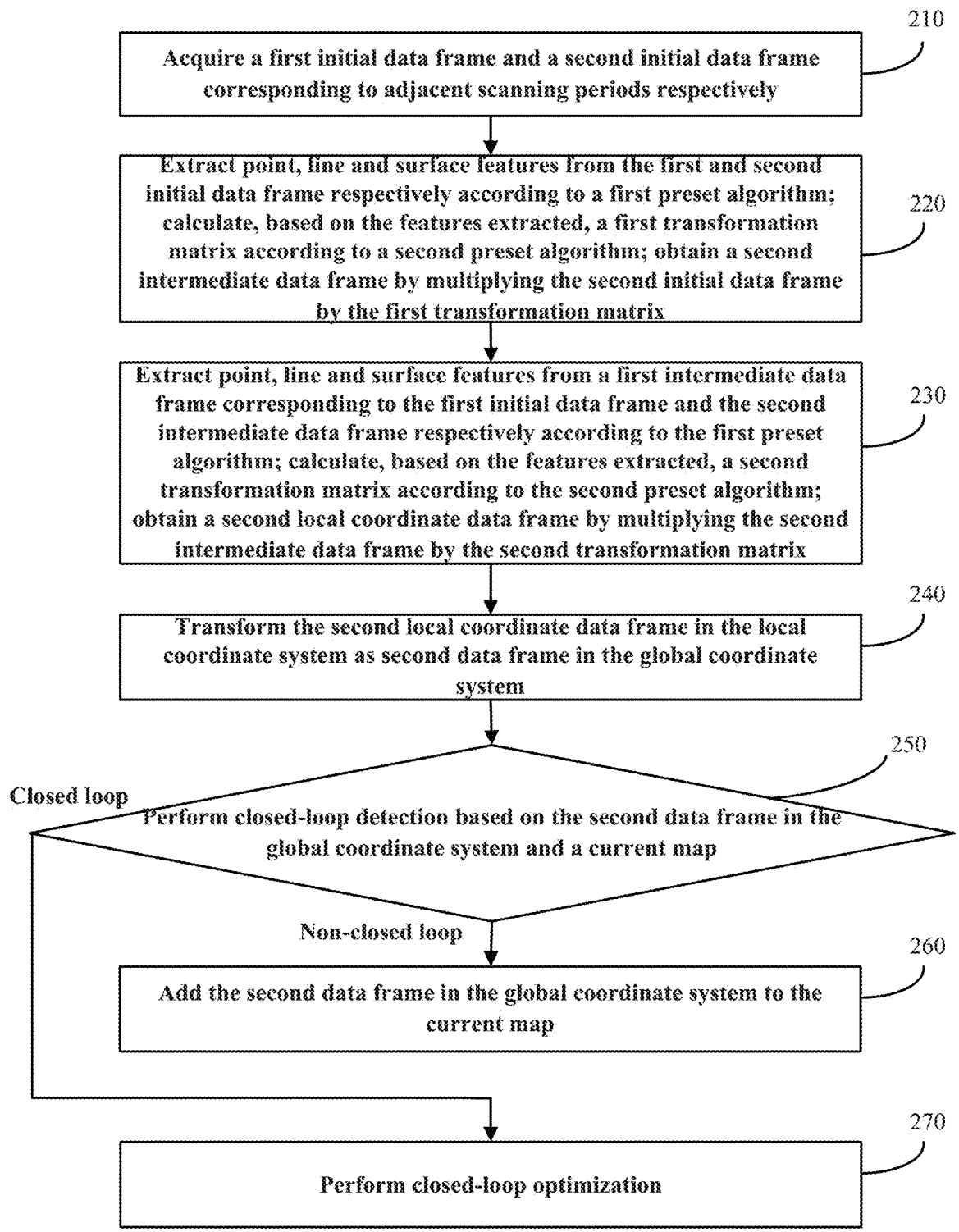
FIG. 2 is a flowchart illustrating a LIDAR-based mapping method according to embodiment II of the present disclosure.

FIG. 2 is a flowchart illustrating a LIDAR-based mapping method according to embodiment II of the present disclosure. The present embodiment is optimized based on the above-mentioned embodiment. As illustrated in FIG. 2, the method of the present embodiment includes steps 210~270.

In step 210, a first initial data frame and a second initial data frame corresponding to adjacent scanning periods are obtained respectively.

The initial data frames contain point cloud data scanned by a LIDAR and navigation data collected by an IMU. The scanning period corresponding to the first initial data frame precedes the scanning period corresponding to the second initial data frame, and the serial number of the first initial data frame is greater than 1.

In step 220, point, line and surface features are extracted from the first initial data frame and the second initial data frame respectively according to a first preset algorithm, a first transformation matrix is calculated based on the extracted features according to a second preset algorithm and a second intermediate data frame is obtained by multiplying the second initial data frame by the first transformation matrix.

In step 230, point, line and surface features are extracted from a first intermediate data frame corresponding to the first initial data frame and the second intermediate data frame respectively according to the first preset algorithm, a second transformation matrix is calculated based on the extracted features according to the second preset algorithm and a second local coordinate data frame is obtained by multiplying the second intermediate data frame by the second transformation matrix.

In step 240, the second local coordinate data frame in a local coordinate system is transformed as a second data frame in the global coordinate system.

In step 250, closed-loop detection is performed based on the second data frame in the global coordinate system and a current map. When a non-closed loop is detected, the method proceeds to step 260, while when a closed loop is detected, the method proceeds to step 270.

Exemplarily, the present step may include: determining a data frame to be registered in the current map which corresponds to the second data frame in the global coordinate system; calculating the Euclidean distance between the geometric center of the second data frame in the global coordinate system and the geometric center of the data frame to be registered; and determining that a closed loop is detected when the Euclidean distance is within a first preset range while determining that a non-closed loop is detected when the Euclidean distance is outside the first preset range.

Preferably, the data frame to be registered may be a first data frame in the global coordinate system in the current map which corresponds to the first initial data frame. The first preset range may be determined according to actual requirements.

In step 260, the second data frame in the global coordinate system is added to the current map.

In step 270, closed-loop optimization is performed.

Preferably, the present step may include: calculating a covariance matrix of corresponding feature point pairs in the second data frame in the global coordinate system and the first data frame in the global coordinate system corresponding to the first initial data frame; and determining whether the covariance matrix meets a preset registration requirement, and performing closed-loop optimization if the covariance matrix meets the preset registration requirement while updating and adjusting the second data frame in the global coordinate system and repeating the above-mentioned related step in calculating the covariance matrix if not.

Optionally, the preset registration requirement is that the difference between the covariance matrix and a unit matrix is within a second preset range. That is, the difference between the eigenvalue of the covariance matrix and the eigenvalue of the unit matrix is less than a preset value. The preset value may be 0.1.

Exemplarily, the feature point pairs may be point, line and surface features extracted according to the first preset algorithm in the present embodiment or other features extracted according to another method, and are not restricted in the present embodiment.

Exemplarily, updating and adjusting the second data frame in the global coordinate system includes: considering the second local coordinate data frame as a new second intermediate data frame; extracting point, line and surface features from the first intermediate data frame corresponding to the first initial data frame and the new second intermediate data frame respectively according to the first preset algorithm; calculating a new second transformation matrix based on the extracted features; obtaining a new second local coordinate data frame by multiplying the new second intermediate data frame by the new second transformation matrix; and transforming the new second local coordinate data frame into a new second data frame in the global coordinate system.

Preferably, performing closed-loop optimization may include:

calculating a third transformation matrix according to the following formulas:

$$E_{ij} = X_i - T_{i,j} \cdot X_j$$

$$\varphi = \sum_{i,j} \|E_{i,j}\|_2^2$$

where "i" is a point in a data frame to be registered in the current map, $X_i$ is a coordinate of "i", "j" is a point in the second data frame in the global coordinate system, $X_j$ is a coordinate of "j", $T_{i,j}$ is the third transformation matrix, $E_{i,j}$ is a registration error and $\varphi$ is a preset norm; and adding the second data frame in the global coordinate system multiplied by the third transformation matrix to the current map.

Based on the graph theory, suppose that G={V, E}, which is composed of nodes and sides. V denotes different nodes and E denotes weight of the sides. Each node has position and attitude information represented by translation and rotation matrixes. The ith-frame data and the jth-frame data are registered via T. Ideally, $$X_i = T_{i,j} \cdot X_j$$

However, in practice, their estimated values have certain errors.

$$E_{i,j} = X_i - T_{i,j} \cdot X_j$$

Each side has a certain error. A norm is defined for these errors so that an objective function for map optimization is obtained:

$$\varphi = \sum_{i,j} \|E_{i,j}\|_2^2$$

Then this function is solved.

In the present embodiment, in the process of updating a map, closed-loop detection is added, and closed-loop optimization is performed according to the closed-loop condition, thereby further improving the accuracy and accuracy of the outputted map.

Embodiment III

Figure 3:
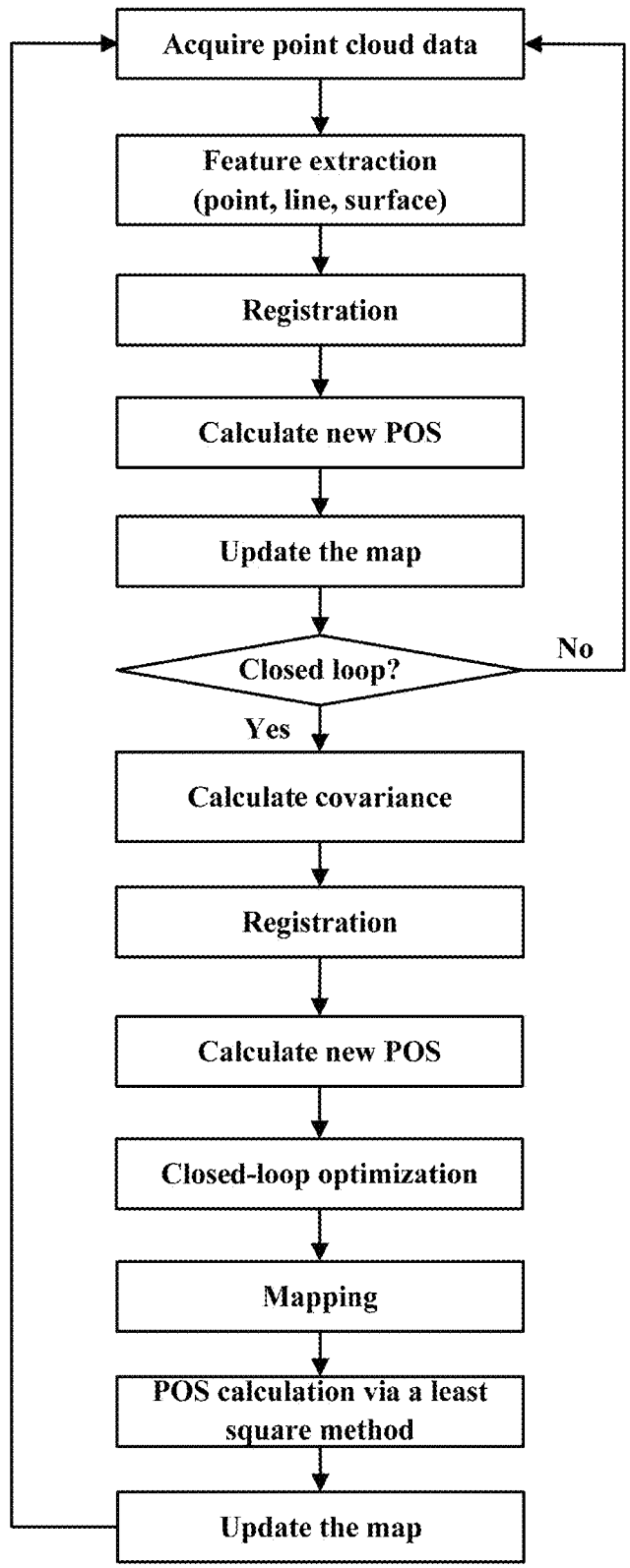
FIG. 3 is a flowchart illustrating a LIDAR-based mapping method according to embodiment III of the present disclosure.

Embodiment III of the present disclosure provides a specific preferred example based on the above-mentioned embodiment. FIG. 3 is a flowchart illustrating a LIDAR-based mapping method according to embodiment III of the present disclosure.

(1) A thread is started to collect LIDAR data packages from a network port.

(2) A thread receives LIDAR data packages and transforms received data packages to data in the form of point cloud containing X, Y, Z and time information each time LIDAR data packages are received.

(3) A thread collects IMU data from a serial port.

(4) A thread extracts point, line and surface features according to curvature and performs registration.

Assume that the current data scanned is $P_k$, the next data scanned is $P_{k+1}$ and $P_k$, $P_{k+1}$ are available. Point, line and surface features extracted from $P_{k+1}$ are denoted by $F_{k1+1}$, $F_{k2+1}$ and $F_{k3+1}$ respectively. Corresponding point, line and surface features found in $P_k$ are denoted by $F_{k1}, F_{k2}$ and $F_{k3}$ respectively. A transformation matrix T is obtained by determining rotation and translation parameters between the point cloud data obtained from the data through two scanning via a least square method based on the extracted features, and $P_k$ is matched with $P_{k+1}$. $P_{k+1}$ is multiplied by the transformation matrix to obtain $P_{k+1}'$, thereupon being transformed into a coordinate system where $P_k$ is located and achieving registration between $P_k$ and $P_{k+1}$.

(5) An odometer thread receives features and performs registration.

Input: $P_k'$, $P_{k+1}'$

Output: $P_{k+1}''$, new transformation matrix T'

Step 1: If the current data scanned is the first frame, then T=0.

Step 2: Point, line and surface features in $P_{k+1}'$ are detected and are denoted by $F_{k1+1}'$, $F_{k2+1}'$ and $F_{k3+1}'$ respectively.

Step 3: In $P_k'$, each point having the same name as each point in $F_{k1+1}'$, $F_{k2+1}'$ and $F_{k3+1}'$ is searched for respectively.

Step 4: The transformation matrix T is updated to T'.

Step 5: Points in $P_{k+1}'$ are reprojected to obtain $P_{k+1}''$.

Step 6: The new transformation matrix T' is returned.

(6) A mapping thread receives point cloud data $P_{k+1}''$ and POS data published by the odometer thread to construct a map.

The POS data contains rotation and translation relationships. After step (5) is completed, the point cloud data $P_{k+1}''$ and the new transformation T' are generated, containing transformation relationships between the two-time scanned point cloud data. In step (6), the point cloud data in a local coordinate system is transformed, by being multiplied by the transformation matrix, into data in a global coordinate system.

(7) Closed-loop detection is performed. If a closed-loop is detected, go to step (8). If not, the current data scanned is added to the map, the map is updated and then the above-mentioned steps are repeated. Optionally, as illustrated in FIG. 3, it is also feasible to first update the map and then perform closed-loop detection.

(8) Closed-loop optimization is performed. The previous map is updated, the current data scanned is added to the current map, the current map is updated and then the above-mentioned steps are repeated.

Figure 4:
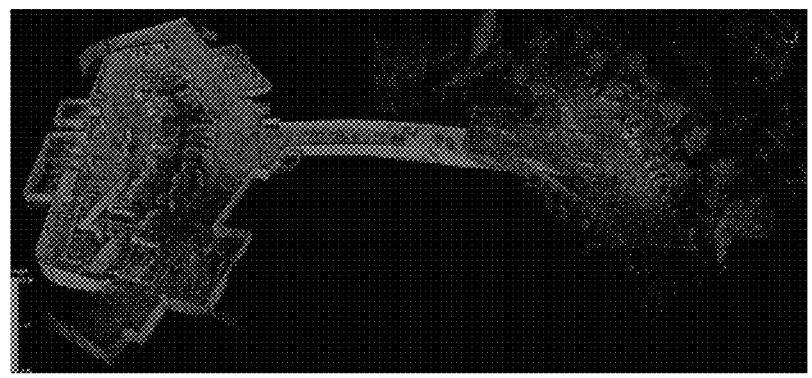
FIG. 4 illustrates a point cloud effect image according to embodiment III of the present disclosure.
Figure 5:
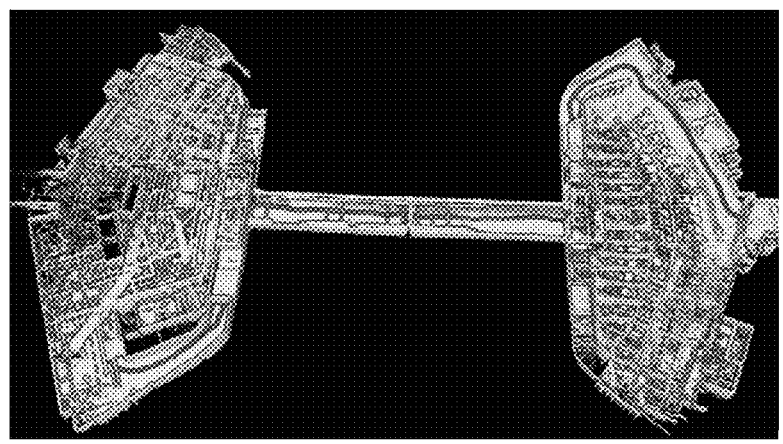
FIG. 5 illustrates another point cloud effect image according to embodiment III of the present disclosure.

The inventor scanned a park's underground garage, woods, outdoor buildings and indoor offices. FIG. 4 is a point cloud effect image illustrating a display effect of point cloud data from the outdoor areas to the first floor of the underground garage according to embodiment III of the present disclosure. FIG. 5 is another point cloud effect image illustrating a display effect of point cloud data from the first floor in area A of the underground garage to the second floor, through a passageway to the second floor of area B and then to the first floor according to embodiment III of the present disclosure. The inventor has found that data obtained by a mobile LIDAR scanning system (LiBackpack) using the methods of the present embodiment has an accuracy of less than 5 cm, completely satisfying the application requirements. In the case of scanning the underground garage, only 450 s is needed to complete high-accuracy scanning from the outdoor areas to the indoor underground garage. This can rapidly represent the real scene and can be applied to underground space management and remediation.

Embodiment IV

Figure 6:
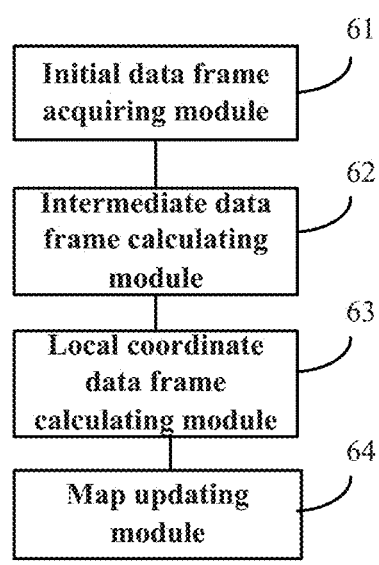
FIG. 6 is a block diagram illustrating a LIDAR-based mapping device according to embodiment IV of the present disclosure.

FIG. 6 is a block diagram illustrating a LIDAR-based mapping device according to embodiment IV of the present disclosure. The device may be implemented by software and/or hardware, be typically integrated into a LIDAR scanning system and perform mapping by executing the LIDAR-based mapping method. As illustrated in FIG. 6, the device includes an initial data frame acquiring module 61, an intermediate data frame calculating module 62, a local coordinate data frame calculating module 63 and a map updating module 64.

The initial data frame acquiring module 61 is configured to acquire a first initial data frame and a second initial data frame corresponding to adjacent scanning periods respectively. The initial data frames contain point cloud data scanned by a LIDAR and navigation data collected by an IMU. A scanning period corresponding to the first initial data frame precedes a scanning period corresponding to the second initial data frame and a serial number of the first initial data frame is greater than 1.

The intermediate data frame calculating module 62 is configured to extract point, line and surface features from the first initial data frame and the second initial data frame respectively according to a first preset algorithm; calculate, based on the extracted features, a first transformation matrix according to a second preset algorithm; and obtain a second intermediate data frame by multiplying the second initial data frame by the first transformation matrix.

The local coordinate data frame calculating module 63 is configured to extract point, line and surface features from a first intermediate data frame corresponding to the first initial data frame and the second intermediate data frame respectively according to the first preset algorithm; calculate, based on the extracted features, a second transformation matrix according to the second preset algorithm and obtain a second local coordinate data frame by multiplying the second intermediate data frame by the second transformation matrix.

The map updating module 64 is configured to transform the second local coordinate data frame in a local coordinate system into a frame in a global coordinate system; and update a map.

The LIDAR-based mapping device of the present embodiment can provide a map with a high accuracy and accuracy. Moreover, GPS is not needed during the mapping process, so the device is applicable to multiple indoor and outdoor application scenarios and, in particular, to a mobile LIDAR scanning system. The hardware composition of the scanning system can be streamlined, thereby saving system space usage and manufacture costs. Furthermore, setting up a scanner on a station and manual stitching are needed in conventional methods while the present embodiment can achieve automatic stitching.

Based on the present embodiment, point, line and surface features are extracted from the first initial data frame according to the first preset algorithm through the following manner:

extracting point, line and surface features from the first initial data frame according to the following formula:

$$f = \frac{1}{|p| \cdot \|X_i\|} \| \sum_{j \in p, j \neq i} \|(X_i - X_j)\|$$

In the formula, the first initial data frame is $P_k$, a point feature of $P_k$ is $F_{k1}$, a line feature of $P_k$ is $F_{k2}$, a surface feature of $P_k$ is $F_{k3}$, 'i' is a point in $P_k$, $X_i$ is a coordinate of point 'i', 'p' is a set of neighborhood points of 'i', 'j' is a point in 'p', Xj is a coordinate of point 'j' and 'f' is an eigenvalue; and thresholds $M_1$, $M_2$, $M_3$ and $M_4$ are pregiven, 'f' is $F_{k1}$ when 'f' is less than $M_1$, 'f' is $F_1$ when 'f' is greater than $M_2$ and less than $M_3$, and 'f' is $F_{k3}$ when 'f' is greater than $M_4$.

Based on the present embodiment, the first transformation matrix is calculated in the following manner based on the extracted features according to the second preset algorithm:

solving, based on the extracted features, rotation and translation parameters between the first initial data frame and the second initial data frame via a least square method, to obtain the first transformation matrix.

Based on the present embodiment, the second local coordinate data frame in the local coordinate system is transformed into the frame in the global coordinate system and the map is updated through the following manner:

transforming the second local coordinate data frame in the local coordinate system as a second data frame in the global coordinate system; and performing closed-loop detection based on the second data frame in the global coordinate system and a current map, and adding the second data frame in the global coordinate system to the current map when a non-closed loop is detected while performing closed-loop optimization when a closed loop is detected.

Based on the present embodiment, performing closed-loop detection based on the second data frame in the global coordinate system and a current map includes:

determining a data frame to be registered in the current map which corresponds to the second data frame in the global coordinate system;

calculating a Euclidean distance between a geometric center of the second data frame in the global coordinate system and a geometric center of the data frame to be registered; and determining that a closed loop is detected when the Euclidean distance is within a first preset range while determining that a non-closed loop is detected when the Euclidean distance is outside the first preset range.

Based on the present embodiment, performing closed-loop optimization when a closed loop is detected includes:

calculating a covariance matrix of corresponding feature point pairs in the second data frame in the global coordinate system and a first data frame in the global coordinate system corresponding to the first initial data frame; and determining whether the covariance matrix meets a preset registration requirement, and performing closed-loop optimization if the covariance matrix meets the preset registration requirement while updating and adjusting the second data frame in the global coordinate system and repeating the above-mentioned related step in calculating the covariance matrix if not.

Based on the present embodiment, the preset registration requirement is that a difference between the covariance matrix and a unit matrix is within a second preset range.

Based on the present embodiment, performing closed-loop optimization includes:

calculating a third transformation matrix according to the following formulas:

$$E_{ij} = X_i - T_{i,j} \cdot X_j$$

$$\varphi = \sum_{i,j} \|E_{i,j}\|_2^2$$

where 'i' is a point in a data frame to be registered in the current map, $X_i$ is a coordinate of 'j' is a point in the second data frame in the global coordinate system, $X_j$ is a coordinate of 'j', $T_{i,j}$ is the third transformation matrix, $E_{i,j}$ is a registration error and $\varphi$ is a preset norm; and adding the second data frame in the global coordinate system multiplied by the third transformation matrix to the current map.

Embodiment V

The present embodiment provides a storage medium containing computer-executable instructions. The computer-executable instructions, when executed by a computer processor, are used for executing a LIDAR-based mapping method. The method includes:

acquiring a first initial data frame and a second initial data frame corresponding to adjacent scanning periods respectively, where the initial data frames contain point cloud data scanned by a LIDAR and navigation data collected by an IMU, a scanning period corresponding to the first initial data frame precedes a scanning period corresponding to the second initial data frame and a serial number of the first initial data frame is greater than 1;

extracting point, line and surface features from the first initial data frame and the second initial data frame respectively according to a first preset algorithm; calculating, based on the extracted features, a first transformation matrix according to a second preset algorithm; and obtaining a second intermediate data frame by multiplying the second initial data frame by the first transformation matrix;

extracting point, line and surface features from a first intermediate data frame corresponding to the first initial data frame and the second intermediate data frame respectively according to the first preset algorithm; calculating, based on the extracted features, a second transformation matrix according to the second preset algorithm and obtaining a second local coordinate data frame by multiplying the second intermediate data frame by the second transformation matrix; and transforming the second local coordinate data frame in a local coordinate system a a frame in a global coordinate system and updating a map.

Optionally, the computer-executable instructions, when executed by the computer processor, may further be used for executing the LIDAR-based mapping method provided by any embodiment of the present disclosure.

From the above description of embodiments, it will be apparent to those skilled in the art that the present disclosure may be implemented by means of software and necessary general-purpose hardware, or may of course be implemented by hardware, but in many cases the former is a preferred embodiment. Based on such understanding, the present disclosure, either essentially or in terms of contributions to the related art, may be embodied in the form of software products. The computer software products may be stored in a computer-readable storage medium such as a computer floppy disk, a read-only memory (ROM), a random access memory (RAM), a flash memory, a hard disk, a CD, etc. The storage medium contains a number of instructions for enabling a computer device (which may be a personal computer, a server or a network device, etc.) to perform the method described in any embodiment of the present disclosure.

Embodiment VI

The present embodiment provides a terminal, including the LIDAR-based mapping device provided by any embodiment of the present disclosure.

Figure 7:
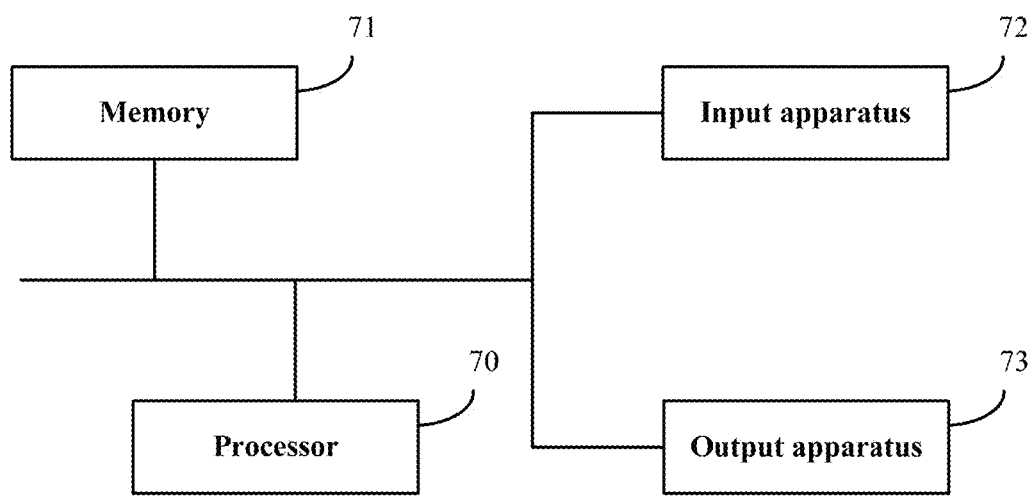
FIG. 7 is a block diagram illustrating a terminal according to embodiment VI of the present disclosure.

Specifically, as illustrated in FIG. 7, the present embodiment provides a terminal including a processor 70, a memory 71, an input apparatus 72 and an output apparatus 73. The terminal may have one or more processors 70, with one processor 70 as an example in FIG. 7. The processor 70, the memory 71, the input apparatus 72 and the output apparatus 73 in the terminal may be connected via a bus or other means, with connection via a bus as an example in FIG. 7.

The memory 71 functions as a computer-readable storage medium for storing software programs, computer-executable programs and modules, such as program instructions/modules corresponding to the LIDAR-based mapping method in embodiments of the present disclosure (e.g., the initial data frame acquiring module 61, the intermediate data frame calculating module 62, the local coordinate data frame calculating module 63 and the map updating module 64 in the LIDAR-based mapping device). The processor 70 runs the software programs, instructions and modules stored in the memory 71 to perform various function applications and data processing of the terminal, that is, to implement the above-mentioned LIDAR-based mapping method.

The memory 71 may mainly include a program storage area and a data storage area. The program storage area may store an operating system and at least one function-required application. The data storage area may store data created according to the use of the terminal. In addition, the memory 71 may include a high-speed random access memory and a nonvolatile memory, such as at least one disk memory, a flash memory or other nonvolatile solid-state memories. In some examples, the memory 71 may further include memories that are remotely disposed with respect to the processor 70. These remote memories may be connected to the terminal via a network. Examples of the above-mentioned network include, but are not limited to, the Internet, an intranet, a local area network, a mobile communication network and a combination thereof.

The input apparatus 72 is configured to receive inputted digital or character information and key signal input related to user settings and function control of the terminal. The output apparatus 73 may include a display screen and other display devices.

Embodiment VII

The present embodiment provides a LIDAR scanning system, including a LIDAR scanner, an IMU, a processor, a memory and a computer program stored in the memory and operable by the processor. The processor is configured to, when executing the computer program, perform the following steps:

acquiring a first initial data frame and a second initial data frame corresponding to adjacent scanning periods respectively, where the initial data frames contain point cloud data scanned by a LIDAR and navigation data collected by an IMU, a scanning period corresponding to the first initial data frame precedes a scanning period corresponding to the second initial data frame and a serial number of the first initial data frame is greater than 1;

extracting point, line and surface features from the first initial data frame and the second initial data frame respectively according to a first preset algorithm; calculating, based on the extracted features, a first transformation matrix according to a second preset algorithm and obtaining a second intermediate data frame by multiplying the second initial data frame by the first transformation matrix;

extracting point, line and surface features from a first intermediate data frame corresponding to the first initial data frame and the second intermediate data frame respectively according to the first preset algorithm; calculating, based on the extracted features, a second transformation matrix according to the second preset algorithm; and obtaining a second local coordinate data frame by multiplying the second intermediate data frame by the second transformation matrix; and transforming the second local coordinate data frame in a local coordinate system as a frame in a global coordinate system and updating a map.

Preferably, the LIDAR scanning system further includes a storage control system, a power supply, a backpack, a lower fixing plate, a vertical connecting bar and an upper fixing plate.

The lower fixing plate is connected to the upper fixing plate via the vertical connecting bar. The upper fixing plate is detachably connected to the vertical connecting bar. The lower fixing plate is disposed in the backpack and the upper fixing plate is disposed outside the backpack.

The storage control system is disposed on the lower fixing plate. The processor and the memory are integrated into the storage control system. The storage control system further includes a LIDAR scanner interface and an IMU interface.

The LIDAR scanner and the IMU are disposed on the upper fixing plate. The LIDAR scanner is connected to the storage control system via the LIDAR scanner interface, and the IMU is connected to the storage control system via the IMU interface.

Figure 8:
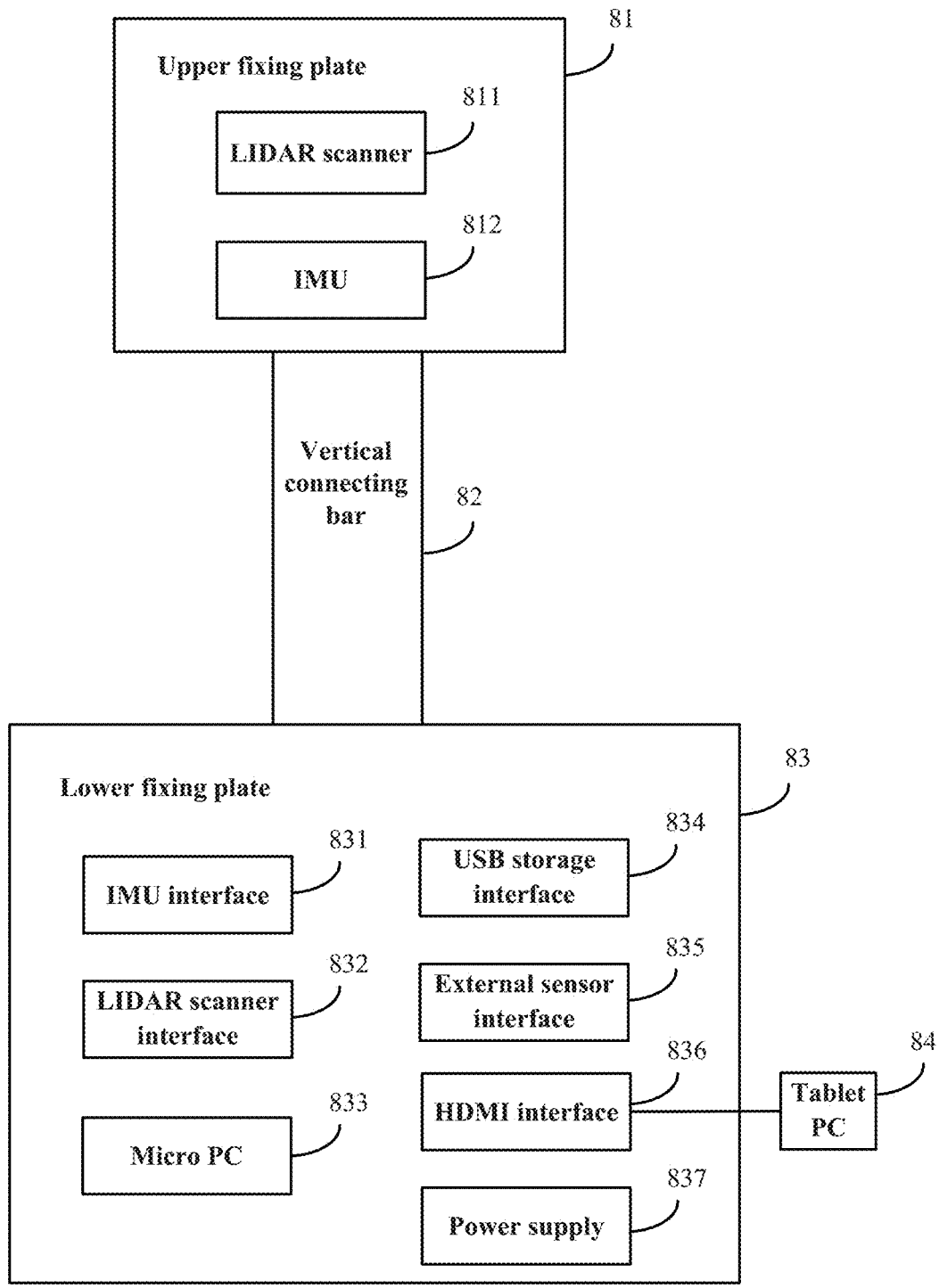
FIG. 8 is a block diagram illustrating a LIDAR scanning system according to embodiment VII of the present disclosure.

FIG. 8 is a block diagram illustrating a LIDAR scanning system according to embodiment VII of the present disclosure. As illustrated in FIG. 8, a LIDAR scanning system includes a LIDAR scanner 811, an IMU 812, a storage control system and a power supply system, and may further include one or more external sensors (such as an optical camera and a hyperspectral camera). The LIDAR scanner 811 uses a high-frequency ranging laser head capable of rotating at high-speed to continuously record ranging data in different directions, thereby obtaining three-dimensional coordinate information with the scanning center as a datum. This information is used for obtaining high-density and high-accuracy LIDAR point cloud data to represent a real three-dimensional scene. LIDAR scanner Velodyne VLP-16 or Velodyne HDL-32E may be selected for obtaining centimeter-level high-accuracy three-dimensional point cloud data in real time. An IMU 812 is composed of a high-accuracy three-axis gyroscope and three accelerometers in axis directions. Its main advantages lie in that it can obtain attitude and coordinate positions in real time without external references and can achieve time synchronization between the storage control system and the LIDAR scanner. The storage control system may include a housing, a micro PC 833, a storage hard disk, a connection interface, etc. When operating, the power supply system powers all devices including the IMU 812 and the LIDAR scanner. The micro PC 833 may use an Intel NUC main board to control the data collection starting time and the working status of the LIDAR scanner 811 and the IMU 812. Data collected by the LIDAR scanner 811 and the IMU 812 is stored and recorded by the hard disk. Data collected by the one or more external sensors is transferred to the micro PC 833 for storage and recording.

The LIDAR scanner 811, the IMU 812, the storage control system and the external sensors are all fixed to a mounting bracket. The mounting bracket includes an upper fixing plate 81 and a lower fixing plate 83. The upper fixing plate 81 and the lower fixing plate 83 are connected to each other via a vertical connecting bar 82. The mounting bracket further includes an IMU fixing interface, a LIDAR scanner fixing interface, one or more external sensor interfaces, an HDMI interface, a network port, etc. The LIDAR scanner 811 and the IMU 812 are disposed on the upper fixing plate 81. The IMU 812 is disposed below the LIDAR scanner 811 for an integrated design so that the structure of the scanning system is more compact and thus saves a lot of space. The IMU 812 and the LIDAR scanner 811 are connected to the lower fixing plate 83 via the vertical connecting bar 82. The lower fixing plate 83 is disposed in a backpack and mainly includes a micro PC 833, a battery 837, an IMU interface 831, a LIDAR scanner interface 832, an HDMI interface 836, a USB storage interface 834, an external sensor interface 835, a network port, etc. A tablet PC 84 may be connected to the micro PC 833 via the HDMI interface 836 for data collection control, real-time display and storage during walking.

The backpack platform can work effectively in the absence of GPS signals. To achieve both use via the backpack and handheld use, the present disclosure designs a detachable structure at the junction of the vertical connecting bar and the backpack (lower fixing plate) so that the scanning device can be detached at any time during a scanning process.

The LIDAR scanning system provided by the present embodiment combines the LIDAR and the SLAM algorithm to achieve indoor and outdoor integrated mobile measurement, eliminating the need for station moving, data stitching and other tedious work compared with traditional fixed station scanning. The LIDAR scanning system provided by the present embodiment can scan the target in all directions without dead angles and thus can provide a high-accuracy and high-accuracy map and a high-efficiency mapping process. Moreover, GPS is not needed during the mapping process, so the system is applicable to multiple indoor and outdoor application scenarios and, in particular, to a mobile LIDAR scanning system. The hardware composition of the scanning system can be streamlined, with a compact and portable design, thereby saving system space usage and manufacture costs.

The LIDAR-based mapping device, storage medium, terminal and LIDAR-based scanning system provided by the above-mentioned embodiments can execute the LIDAR-based mapping method provided by any embodiment of the present disclosure and have function modules and beneficial effects corresponding to this method. For technical details not described in detail in the above-mentioned embodiments, see the LIDAR-based mapping method provided by any embodiment of the present disclosure.

It is to be noted that the above are only preferred embodiments of the present disclosure and the technical principles used therein. It will be understood by those skilled in the art that the present disclosure is not limited to the specific embodiments described herein. Those skilled in the art can make various apparent changes, modifications and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

What is claimed is:

1. A LIDAR-based mapping method, comprising:
  acquiring a first initial data frame and a second initial data frame corresponding to adjacent scanning periods respectively, wherein the first initial data frame and the second initial data frame are obtained based on point cloud data scanned by a LIDAR and navigation data collected by an Inertial Measurement Unit (IMU), a scanning period corresponding to the first initial data frame precedes a scanning period corresponding to the second initial data frame and a serial number of the first initial data frame is greater than 1;
  extracting point, line and surface features of the first initial data frame from the first initial data frame and point, line and surface features of the second initial data frame from the second initial data frame according to a first preset algorithm respectively, calculating, based on the point, line and surface features of the first initial data frame and the point, line and surface features of the second initial data frame, a first transformation matrix according to a second preset algorithm and obtaining a second intermediate data frame by multiplying the second initial data frame by the first transformation matrix;

extracting point, line and surface features of the first intermediate data frame from a first intermediate data frame corresponding to the first initial data frame and point, line and surface features of the second intermediate data frame from the second intermediate data frame according to the first preset algorithm respectively, calculating, based on the point, line and surface features of the first intermediate data frame and the point, line and surface features of the second intermediate data frame, a second transformation matrix according to the second preset algorithm and obtaining a second local coordinate data frame by multiplying the second intermediate data frame by the second transformation matrix; and transforming the second local coordinate data frame in a local coordinate system as a frame in a global coordinate system and updating a map.

2. The method according to claim 1, wherein the extracting point, line and surface features of the first initial data frame from the first initial data frame according to the first preset algorithm comprises:

extracting point, line and surface features of the first initial data frame from the first initial data frame using the following formula:

$$f = \frac{1}{|p| \cdot \|X_i\|} \| \sum_{j \in p, j \neq i} \|(X_i - X_j)\|$$

wherein the first initial data frame is $P_k$, a point feature of $P_k$ is $F_{k1}$, a line feature of $P_k$ is $F_{k2}$, a surface feature of $P_k$ is $F_{k3}$, 'i' is a point in $P_k$, $X_i$ is a coordinate of point 'i', 'p' is a set of neighborhood points of point 'i', 'j' is a point in 'p', $X_j$ is a coordinate of point 'j' and 'f' is an eigenvalue; and thresholds $M_1$, $M_2$, $M_3$ and $M_4$ are pregiven, 'f' is $F_{k1}$ when 'f' is less than $M_1$, 'f' is $F_{k2}$ when 'f' is greater than $M_2$ and less than $M_3$, and 'f' is $F_{k3}$ when 'f' is greater than $M_4$.

3. The method according to claim 1, wherein the calculating, based on the point, line and surface features of the first initial data frame and the point, line and surface features of the second initial data frame, the first transformation matrix according to the second preset algorithm comprises:

solving, based on the point, line and surface features of the first initial data frame and the point, line and surface features of the second initial data frame, rotation and translation parameters between the first initial data frame and the second initial data frame via a least square method, so as to obtain the first transformation matrix.

4. The method according to claim 1, wherein the transforming the second local coordinate data frame in a local coordinate system as the frame in the global coordinate system and updating the map comprises:

transforming the second local coordinate data frame in the local coordinate system as a second data frame in the global coordinate system; and performing closed-loop detection based on the second data frame in the global coordinate system and a current map, and adding the second data frame in the global coordinate system to the current map when a non-closed loop is detected while performing closed-loop optimization when a closed loop is detected.

5. The method according to claim 4, wherein the performing closed-loop detection based on the second data frame in the global coordinate system and a current map comprises:

determining a data frame to be registered in the current map, wherein the data frame to be registered corresponds to the second data frame in the global coordinate system;

calculating a Euclidean distance between a geometric center of the second data frame in the global coordinate system and a geometric center of the data frame to be registered; and determining that a closed loop is detected when the Euclidean distance is within a first preset range while determining that a non-closed loop is detected when the Euclidean distance is outside the first preset range.

6. The method according to claim 4, wherein the performing closed-loop optimization when a closed loop is detected comprises:

calculating a covariance matrix of corresponding feature point pairs in the second data frame in the global coordinate system and a first data frame in the global coordinate system corresponding to the first initial data frame; and determining whether the covariance matrix meets a preset registration requirement, and performing closed-loop optimization if the covariance matrix meets the preset registration requirement while updating and adjusting the second data frame in the global coordinate system and repeating the step of calculating the covariance matrix if not.

7. The method according to claim 6, wherein the preset registration requirement is that a difference between the covariance matrix and a unit matrix is within a second preset range.

8. The method according to claim 4, wherein the performing closed-loop optimization comprises:

calculating a third transformation matrix using the following formulas:

$$E_{ij} = X_i - T_{i,j} \cdot X_j$$

$$\varphi = \sum_{i,j} \|E_{i,j}\|_2^2$$

wherein 'i' is a point in a data frame to be registered in the current map, $X_i$ is a coordinate of 'i', 'j' is a point in the second data frame in the global coordinate system, $X_j$ is a coordinate of 'j', $T_{i,j}$ is the third transformation matrix, $E_{i,j}$ is a registration error and $\varphi$ is a preset norm; and adding the second data frame in the global coordinate system multiplied by the third transformation matrix to the current map.

9. A LIDAR-based mapping device, comprising:

a processor, and a memory for storing instructions executable by the processor, wherein the instructions when executed by the processor cause the processor to perform the following steps:

acquiring a first initial data frame and a second initial data frame corresponding to adjacent scanning periods respectively, wherein the first initial data frame and the second initial data frame are obtained based on point cloud data scanned by a LIDAR and navigation data collected by an Inertial Measurement Unit (IMU), a scanning period corresponding to the first initial data frame precedes a scanning period corresponding to the second initial data frame and a serial number of the first initial data frame is greater than 1;

extracting point, line and surface features of the first intermediate data frame from the first initial data frame and point, line and surface features of the second initial data frame from the second initial data frame respectively according to a first preset algorithm; calculating, based on the point, line and surface features of the first initial data frame and the point, line and surface features of the second initial data frame, a first transformation matrix according to a second preset algorithm; and obtaining a second intermediate data frame by multiplying the second initial data frame by the first transformation matrix;

extracting point, line and surface features of the first intermediate data frame from a first intermediate data frame corresponding to the first initial data frame and point, line and surface features of the second intermediate data frame from the second intermediate data frame respectively according to the first preset algorithm; calculating, based on the point, line and surface features of the first intermediate data frame and the point, line and surface features of the second intermediate data frame, a second transformation-matrix according to the second preset algorithm; and obtaining a second local coordinate data frame by multiplying the second intermediate data frame by the second transformation matrix; and transforming the second local coordinate data frame in a local coordinate system as a frame in a global coordinate system and updating a map.

10. The device according to claim 9, wherein the extracting the point, line and surface features of the first initial data frame from the first initial data frame according to the first preset algorithm in the following manner:

extracting point, line and surface features of the first initial data frame from the first initial data frame using the following formula:

$$f = \frac{1}{|p| \cdot \|X_i\|} \| \sum_{j \in p, j \neq i} \|(X_i - X_j)\|$$

wherein the first initial data frame is $P_k$, a point feature of $P_k$ is $F_{k1}$, a line feature of $P_k$ is $F_{k2}$, a surface feature of $P_k$ is $F_{k3}$, is a point in $P_k$, $X_i$ is a coordinate of point 'i', 'p' is a set of neighborhood points of point 'i', 'j' is a point in 'p', $X_i$ is a coordinate of point 'j' and 'f' is an eigenvalue; and thresholds $M_1$, $M_2$, $M_3$ and $M_4$ are pregiven, 'f' is $F_{k1}$ when 'f' is less than $M_1$, 'f' is $F_{k2}$ when 'f' is greater than $M_2$ and less than $M_3$, and 'f' is $F_{k3}$ when 'f' is greater than $M_4$.

11. The device according to claim 9, wherein the transforming of the second local coordinate data frame in the local coordinate system as the frame in the global coordinate system and updating the map are performed in the following manner:

transforming the second local coordinate data frame in the local coordinate system as a second data frame in the global coordinate system; and performing closed-loop detection based on the second data frame in the global coordinate system and a current map, and adding the second data frame in the global coordinate system to the current map when a non-closed loop is detected while performing closed-loop optimization when a closed loop is detected.

12. The device according to claim 11, wherein the performing closed-loop optimization comprises:

calculating a third transformation matrix using the following formulas:

$$E_{ij} = X_i - T_{i,j} \cdot X_j$$

$$\varphi = \sum_{i,j} \|E_{i,j}\|_2^2$$

wherein 'i' is a point in a data frame to be registered in the current map, $X_i$ is a coordinate of 'i' is a point in the second data frame in the global coordinate system, $X_j$ is a coordinate of 'j', $T_{i,j}$ is the third transformation matrix, $E_{i,j}$ is a registration error and $\varphi$ is a preset norm; and adding the second data frame in the global coordinate system multiplied by the third transformation matrix to the current map.

13. A LIDAR scanning system, comprising a LIDAR scanner, an Inertial Measurement Unit (IMU), a processor, a memory and a computer program stored in the memory and operable in the processor, wherein the computer program, when being executed by the processor, is configured to perform the following steps:

acquiring a first initial data frame and a second initial data frame corresponding to adjacent scanning periods respectively, wherein the initial data frame and the second initial data frame are obtained based on point cloud data scanned by the LIDAR scanner and navigation data collected by the IMU, a scanning period corresponding to the first initial data frame precedes a scanning period corresponding to the second initial data frame and a serial number of the first initial data frame is greater than 1;

extracting point, line and surface features of the first initial data frame from the first initial data frame and point, line and surface features of the second initial data frame from the second initial data frame respectively according to a first preset algorithm, calculating, based on the point, line and surface features of the first initial data frame and the point, line and surface features of the second initial data frame, a first transformation matrix according to a second preset algorithm and obtaining a second intermediate data frame by multiplying the second initial data frame by the first transformation matrix;

extracting point, line and surface features of the first intermediate data frame from a first intermediate data frame corresponding to the first initial data frame and point, line and surface features of the second intermediate data frame from the second intermediate data frame respectively according to the first preset algorithm, calculating, based on the point, line and surface features of the first intermediate data frame and the point, line and surface features of the second intermediate data frame, a second transformation matrix according to the second preset algorithm and obtaining a second local coordinate data frame by multiplying the second intermediate data frame by the second transformation matrix; and transforming the second local coordinate data frame in a local coordinate system as a frame in a global coordinate system and updating a map.

14. The LIDAR scanning system according to claim 13, further comprising a storage control system, a power supply, a backpack, a lower fixing plate, a vertical connecting bar and an upper fixing plate, wherein the lower fixing plate is connected to the upper fixing plate via the vertical connecting bar, the upper fixing plate is detachably connected to the vertical connecting bar, the lower fixing plate is disposed in the backpack and the upper fixing plate is disposed outside the backpack;

the storage control system is disposed on the lower fixing plate, the processor and the memory are integrated into the storage control system, and the storage control system further comprises a LIDAR scanner interface and an IMU interface; and the LIDAR scanner and the IMU are disposed on the upper fixing plate, the LIDAR scanner is connected to the storage control system via the LIDAR scanner interface, and the IMU is connected to the storage control system via the IMU interface.

* * * * *